United States Patent Office
3,632,703
Patented Jan. 4, 1972

3,632,703
STRUCTURAL MATERIAL WITH CONTROLLED GAS ENTRAPMENT
Shelby F. Sullivan, Arcadia, Harper John Whitehouse, Hacienda Heights, and Richard D. Fritz, West Covina, Calif., assignors to the United States of America as represented by the Secretary of the Navy
Filed Mar. 27, 1969, Ser. No. 811,069
Int. Cl. B29d 27/00; B29g 7/02
U.S. Cl. 264—40
10 Claims

ABSTRACT OF THE DISCLOSURE

A structural material with controlled gas-entrapment resulting in an aggregate, mechanically rigid, material having a predetermined density and acoustic velocity of propagation, that is, having a predetermined acoustic impedance, for use, for example, as an "acoustic window" in torpedo transducers. The material is in part defined by the process required to make it. A dispersion of capsules, for example, in the form of glass microspheres, containing either a vacuum or a gas, is interspersed into a curable resin base, formng a resin-capsule matrix. After the resin capsule matrix is stabilized, that is, partially cured, it is subjected to precompression in the range of 5,000 to 30,000 p.s.i. depending upon the predetermined proportion of the glass microspheres that it is desired to crush, which pressure results in a predetermined density of, and causes a predetermined amount of gas or air or voids, to be entrapped within the resin-capsule matrix, thus resulting in an aggregate material with a predetermined impedance.

---

The invention described herein may be manufactured and used by or for the Government of the United States of America for governmental purposes without the payment of any royalties thereon or therefor.

In the field of structural materials having a predetermined velocity of sonic propagation and density, prior art materials involve using polyurethane resins which have a density of few percent heavier than sea water and a velocity equal to sea water. The difficulty with this method is that polyurethane prepared according to prior art methods is not mechanically rigid and deforms too readily under pressure.

The general purpose of this invention is to provide a structural material which embraces all the advantages of similar prior art materials and possesses none of the aforedescribed disadvantages. To attain this, the present invention contemplates a unique method for producing a structural material, to be used in a known environment, and therefore in a known pressure range, which has a desired velocity of sonic propagation and density, that is, has a desired acoustic impedance.

Accordingly, an object of the present invention is to provide a method for producing an aggregate structural material having a desired velocity of acoustic propagation and a desired density.

More specifically, an object of the invention is to provide a method for producing a structural material having a velocity of acoustic propagation and density equal to that of sea water, at any desired operating depth, in order to produce a material which may act as an acoustic "window," by having the same index of refraction as sea water.

Another object of the invention is to provide a method for producing an aggregate structural material using a base material, such as an epoxy resin, having great structural rigidity, and which base material cannot be used by itself because of its excessive density and velocity of acoustic propagation.

Other objects and many of the attendant advantages of this invention will be readily appreciated as the same becomes better understood by reference to the following detailed description, when considered in connection with the accompanying drawings, in which like reference numerals designate like parts throughout the figures thereof and wherein.

Figure 1:
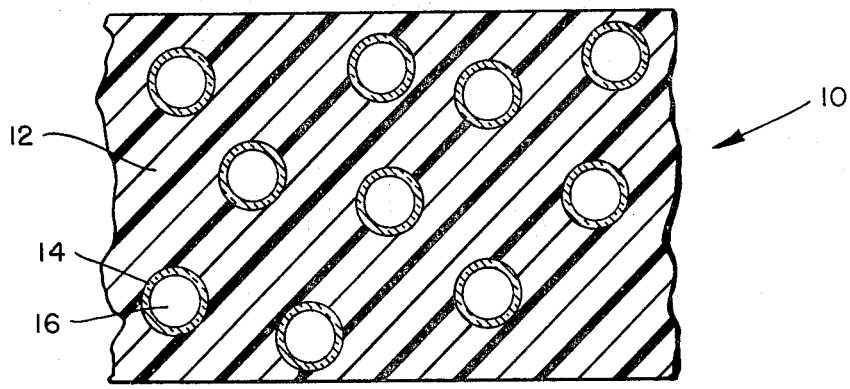
FIG. 1 is a cross-sectional view of the structural material of this invention before the application of pressure to the material.

Referring now to the drawings, wherein like reference numerals designate corresponding parts throughout the several views, there is shown in FIG. 1, an aggregate material in the form of a resin-capsule matrix 10, consisting of a base material, for example a resin base 12, into which are homogenously interspersed a predetermined amount of capsules 14 enclosing a vacuum or gas 16. A typical material for the resin base 12, is an epoxy resin, while the capsules 14 may be glass microspheres which are small, frangible, glass balloons, filled with vacuum or a gas 16. The capsules 14 may also be in the form of compliant, but infrangible, microspheres. FIG. 1 shows the resin-capsule matrix 10 before the application of pressure with few if any of the capsules 14 being broken, when frangible, or deformed when compliant.

Before being subjected to the predetermined pressure, the capsule-resin matrix 10 should first be stabilized, that is, partially cured, and the curing completed while the matrix is subjected to the desired pressure of between 5,000 and 30,000 p.s.i.

The capsule-resin matrix may also be partially cured in advance and then may be stored at a temperature of approximately that of frozen carbon dioxide ($CO_2$).

The capsule-resin matrix used cures very readily in approximately 8 hours at room temperature, and in only about three hours at a temperature of 140° C.

Figure 2:
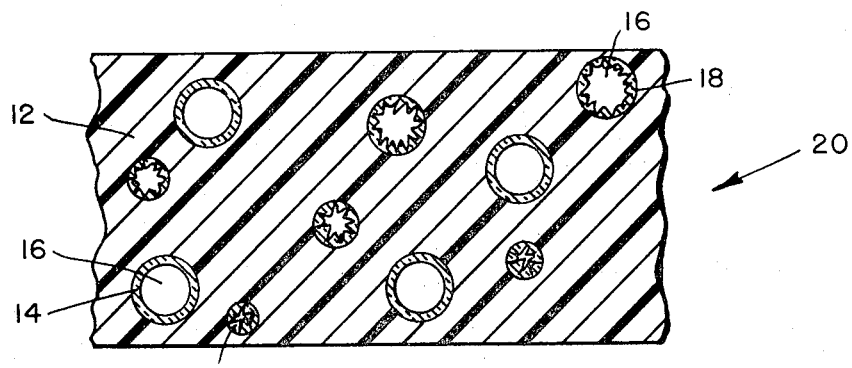
FIG. 2 is a cross-sectional view of the structural material of this invention, wherein the capsules are frangible, after the application of pressure.
Figure 3:
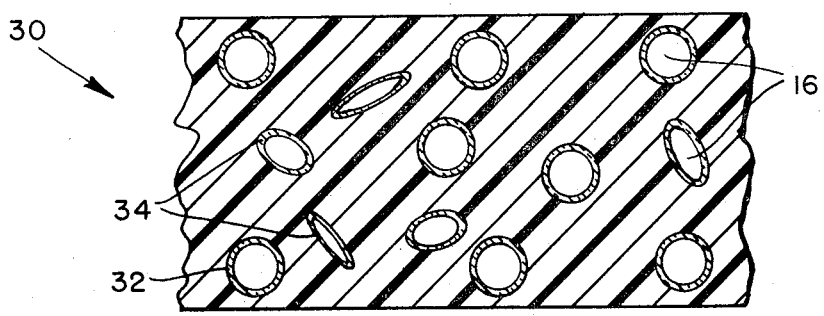
FIG. 3 is a similar cross-sectional view of the structural material, after the application of pressure, but wherein the capsules are compliant, and not frangible.

FIGS. 2 and 3 show the resin-capsule matrix 20 after being subjected to a predetermined pressure, which reduces the thickness of the matrix as compared to its unstressed thickness as shown in FIG. 1. In FIG. 2, it will be noted that, while a certain proportion of the frangible capsules are unbroken, with the number being inversely proportional to the pressure to which the resin-capsule matrix 20 is subjected, other capsules 18 are broken, or even shattered, and enclose a volume comprising glass and gas which in most instances will be reduced from the volume enclosed by unbroken capsules.

Beyond a certain pressure, practically all frangible capsules would break or collapse. However, up to that pressure, the number of capsules which are broken is more or less directly proportional to the pressure to which the resin-capsule matrix 20 is subjected.

The method of this invention involves a controlled gas entrapment inasmuch as the pressure of the gas in the microspheres, while they are intact, can have any value from practically a vacuum to a greater than ambient pressure, with the pressure in most of a specific batch of microspheres having generally the same value; another method of control residing in the proportion of capsules for a given amount of base material 12.

Inasmuch as the aggregate material can have, within very close limits, a predetermined density and acoustic velocity of propagation, that is, its physical properties may be controlled with respect to two parameters, in the process for making the material there must be two variables which can be controlled. One of the variables is the pressure or precompression to which the aggregate material 10 is subjected, while the other variable is the amount or number of capsules which are interspersed in a given mass of base material.

A particularly successful formulation included 150 gm. of an epoxy resin in liquid form known under the trade name of "Epon 815," and manufactured by the Shell Chemical Co., a division of the Shell Oil Co. in New York, N.Y. To this amount was added 10 gm. of a viscous, liquid hardener known by the trade name of "DEAP" (diethylamine propylamine) and manufactured by the same company, and 10.5 gm. of glass microspheres, known under the trade name of "Glass Bubbles," type B35A, sold by the Reflective Products Division of the 3M Company in Minneapolis, Minn. In a typical assortment of the microspheres, 90% of them will be between 20 and 80 microns in size. This particularly successful formulation is exemplified by the curves shown in FIG. 4 for two different working pressures of 2K p.s.i. and 3K p.s.i.

FIG. 3 is a cross-sectional view showing a resin-capsule matrix 30 wherein the capulses 32 and 34 are compliant and infrangible upon exposure to pressure. As was the case in FIG. 1, a certain proportion of all the capsules 32 will not be deformed at all. Other capsules 34 will be in various stages of deformation, due to the pressure or precompression that they have been subjected to. Inasmuch as it is very difficult to fabricate infrangible, completely evacuated, microspheres, the compliant capsules, which may be of a gelatinous matter, generally have a gas within them, perhaps under reduced pressure.

For a given amount of frangible capsules, increasing the pressure, from zero pressure, first causes the aggregate material 10 to have a greater density and a decreased velocity of propagation, as the number of broken microspheres increases. Before compression, many of the capsules are in direct physical contact, and effectively the velocity of acoustic propagation is that of the capsules, generally of glass, themselves, and not of the medium in which the capsules are embedded. As the compression is initiated, some of the frangible capsules break, and the number of capsules in direct physical contact decreases, thereby decreasing the acoustic velocity of propagation, however, causing an increase in the density. As the precompression pressure is further increased, beyond values shown in FIG. 4, the volume occupied by the broken glass and air becomes occupied primarily by glass, and so the density keeps increasing and now the velocity of propagation also increases.

On the other hand, given a certain predetermined precompression to which the aggregate material is subjected, increasing the amount of capsules for a given mass of base material, since it increases the amount of low-density, low-velocity gas into the base material 12, results in a final product whose density and velocity of propagation decreases.

Figure 4:
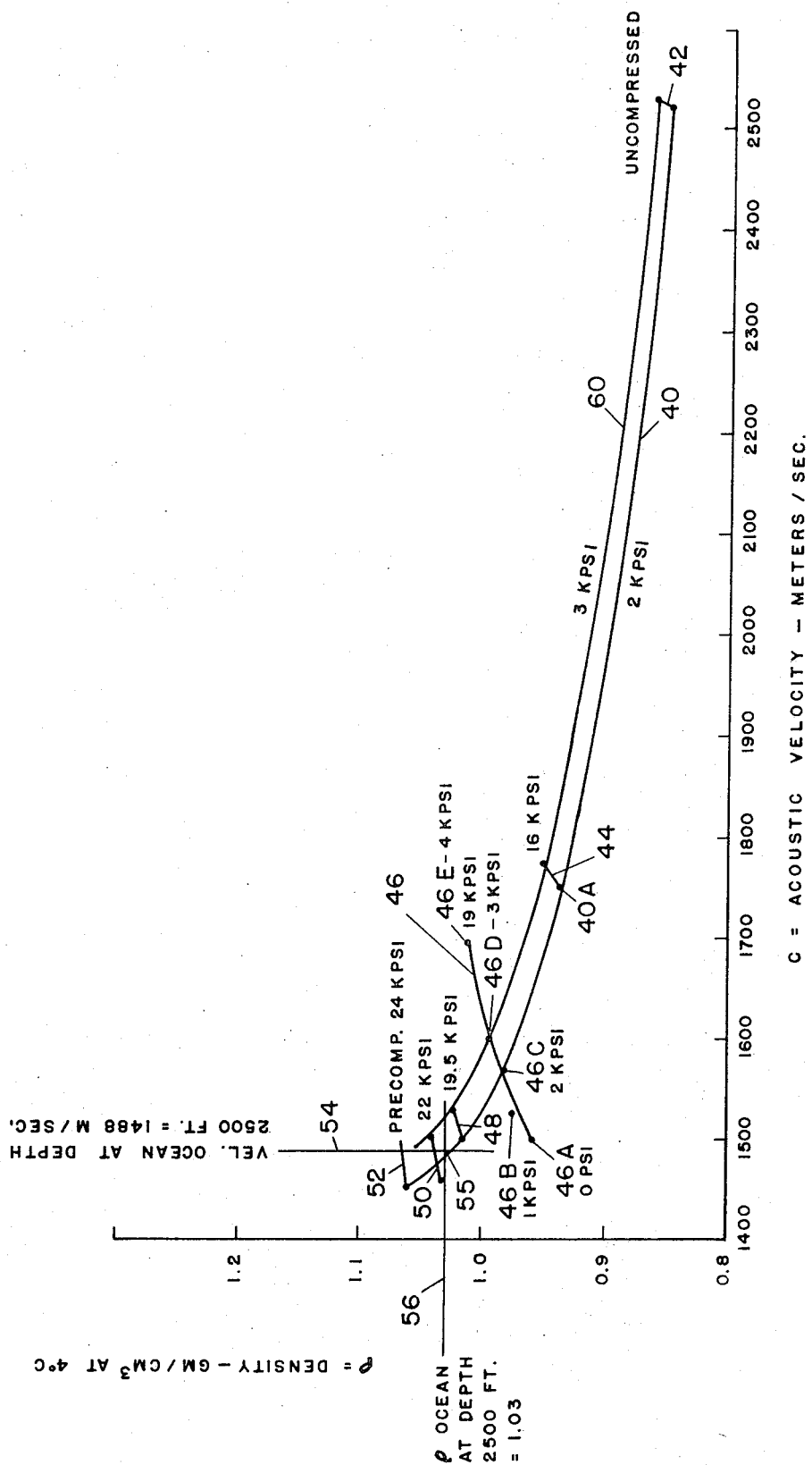
FIG. 4 is a graph showing the density and acoustic velocity of the structural material of this invention as a function of various pre-compressive stresses to which the material is subjected as parameters.

Referring now to FIG. 4, this figure shows two primary curves, a 2K p.s.i. curve 40 and a 3K p.s.i. curve 60, these two values of pressure being parameters which indicate values at which the structural material is to be used, that is, the 2K p.s.i. curve, for example, indicates the characteristics of the structural material when used in an environment where the pressure is 2K p.s.i.

Another set of parameters are shown in this figure. These are the precompression parameters, shown as curves, 42, 44, 46, 48, 50 and 52, angularly disposed to the first set of parameters, and indicating a precompression of 0 p.s.i. at 42, to a precompression of 24K p.s.i. at 52. Curve 46 shows an extended curve showing a precompression of 19K p.s.i., and showing a range of values, of density $\rho$ and acoustic velocity C, for use in environments at 0 p.s.i. to 4K p.s.i., the environmental pressures having reference numerals of 46A to 46E, respectively.

As an example of the use of FIG. 4, if the structural material is to be used at 2K p.s.i., whose curve is shown by reference numeral 40, and required to have an acoustic velocity of 1750 meters/sec. and a density of 0.94 gm./cm.$^3$ to correspond to point 40A on curve 44, it must first be prestressed to a value of 16,000 p.s.i.

It should be pointed out that, having once made a set of curves corresponding to those shown in FIG. 4, for a given composition of structural material, extensive experimentation is not required thereafter. The desired values of $\rho$ and C are preselected, located on the diagram, and since the operating depth is known, the amount of precompression required for the structural material can be either read directly from the given curves, or extrapolated from the curves.

It will be noted that, for any given value of precompresion for example to a value of 16K p.s.i., designated by reference numeral 44, the density $\rho$ and the velocity C are greater for use at 3K p.s.i. as shown on curve 60 than for use at 2K p.s.i. as shown on curve 40.

With respect to the vertical line 54 and the horizontal line 56, the intersection of these two lines at point 55 gives a value of density $\rho=1.03$ and an acoustic velocity $C=1488$ meters per second which are considered to be extrapolated average values of density and acustic velocity at about a 2500 foot depth for the ocean. The required value of precompression to achieve a structural material having these desired average values of $\rho$ and C is seen to be very close to 21K p.s.i.

However, more importantly, the two primary curves 40 and 60 taken in conjunction with the shorter curves of constant precompression 42 through 52, show how it is possible to obtain a structural material which will effectively act as an "acoustic window" in any possible ocean environment.

Should the environment, and specifically the pressure, at which the structural material is to be used be different from the 2K p.s.i. or 3K p.s.i. shown in curves 40 and 60, for example if the structural material is to be used primarily near the top surface of the ocean, a new set of primary curves could be plotted wherein the 2K p.s.i. curve 40 would be replaced by one at 0 p.s.i., and the 3K p.s.i. curve 60 would be replaced by one at 1K p.s.i.

It should be noted that, for a given primary curve, say curve 40, the acoustic velocity when the material is not precompressed, corresponding to a point where the primary curve 40 intersects curve 42, is greater than for any other point on the same primary curve where the material is precompressed. This behavior seems anomalous, inasmuch as it would seem that increasing the density of the capsule-resin matrix would also increase its acoustic velocity. However, the fact that a greater number of capsules is unbroken or undeformed at a lower pressure is a major reason for this type of behavior.

A material other than an epoxy resin may be used as a base material 12, for example, polyurethane may be used. However, curves corresponding to curves 40 and 60 in FIG. 4 would not have a point on them which would correspond to an acoustic window, with respect to ocean water, and the resulting material would not have the mechanical rigidity of a similar material using an epoxy resin.

Obviously many modifications and variations of the present invention are possible in the light of the above teachings. It is therefore to be understood that within the scope of the appended claims the invention may be practiced otherwise than as specifically described.

What is claimed is:

1. A method for making a structural material having a predetermined density between 0.85 and 1.1 and velocity of acoustic propagation, between 1400 and 2550 m./sec., at a given working pressure, comprising the steps of:

homogenously interspersing a predetermined amount of capsules, having a size in the order of 50 microns, into a predetermined mass of a curable resin base and hardener to form a resin-capsule matrix;

partially curing the resin-capsule matrix;

subjecting the matrix to a pressure of 5,000–30,000 p.s.i., while completing the curing until at least a portion of the capsules are permanently deformed; and releasing said pressure when the density and velocity of acoustic propagation of the structural material are at the desired value for the given working pressure.

2. The method according to claim 1, wherein the capsules are glass microspheres containing a vacuum within the glass shell.

3. The method according to claim 1, wherein the capsules are glass microspheres having a gas within.

4. The method according to claim 3, wherein the gas within the microspheres is air.

5. The method according to claim 4, wherein the microspheres have a diameter of from 20 to 80 microns.

6. The method according to claim 1, wherein the resin base is an epoxy resin.

7. The method according to claim 1, wherein the resin base is polyurethane.

8. The method according to claim 1, wherein the capsules are compliant and infrangible microspheres.

9. The method according to claim 1, wherein the compliant and infrangible microspheres have a wall of gelatin.

10. A method for making a structural material having the predetermined density and velocity of acoustic propagation of that of water at a given working pressure of between 2,000 and 3,000 p.s.i., comprising the steps of:

homogenously interspersing an amount of capsules, having a size in the order of 50 microns, of approximately 6.2% by weight, into a mass of curable resin base of approximately 88% by weight, and a mass of hardener of approximately 5.8 by weight, to form a resin-capsule matrix;

partially curing the resin-capsule matrix;

subjecting the resin-capsule matrix to a precompression between 19.5–22.0K p.s.i., while completing the curing until at least a portion of the capsules are permanently deformed; and releasing the precompression when the density and velocity of acoustic propagation of the structural material are at the desired value for the given working pressure.

References Cited
UNITED STATES PATENTS

| | | | |
|---|---|---|---|
| 2,797,201 | 6/1957 | Veatch et al. | 264—53 |
| 2,806,509 | 9/1957 | Bozzacco et al. | 264—45 |
| 3,459,274 | 8/1969 | MacPhail, Sr. | 264—321 |

OTHER REFERENCES

Syntactic Foams for Deep Sea Engineering Applications, Resnick et al., Naval Engineers Journal, April 1968, pp. 235–243.

ROBERT F. WHITE, Primary Examiner

J. R. THURLOW, Assistant Examiner

U.S. Cl. X.R.

181—33 G, 260—2.5 B; 264—48, 120, 321, 331